(12) United States Patent
Sato et al.

(10) Patent No.: US 8,411,241 B2
(45) Date of Patent: Apr. 2, 2013

(54) LIQUID CRYSTAL DISPLAY DEVICE

(75) Inventors: Takeshi Sato, Mobara (JP); Shinichiro Oka, Hitachi (JP); Yoshiaki Toyota, Koshigaya (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 262 days.

(21) Appl. No.: 12/700,754

(22) Filed: Feb. 5, 2010

(65) Prior Publication Data

US 2010/0259713 A1 Oct. 14, 2010

(30) Foreign Application Priority Data

Apr. 8, 2009 (JP) ................. 2009-094004

(51) Int. Cl.
*G02F 1/1333* (2006.01)
*G02F 1/1343* (2006.01)
(52) U.S. Cl. ...................... 349/138; 349/141
(58) Field of Classification Search .............. 349/138, 349/141
See application file for complete search history.

(56) References Cited

U.S. PATENT DOCUMENTS

2005/0128378 A1* 6/2005 Utsumi et al. ................. 349/61
2007/0222923 A1* 9/2007 Wang et al. .................. 349/110
2007/0242204 A1* 10/2007 Fujita et al. .................. 349/141

FOREIGN PATENT DOCUMENTS

| JP | 2000-351974 | 12/2000 |
| JP | 2001-174818 | 6/2001 |
| JP | 2003-029247 | 1/2003 |
| JP | 2007-183299 | 7/2007 |
| JP | 2009-047811 | 3/2009 |
| JP | 2009-223267 | 10/2009 |

* cited by examiner

*Primary Examiner* — Jessica M Merlin
(74) *Attorney, Agent, or Firm* — Antonelli, Terry, Stout & Kraus, LLP.

(57) ABSTRACT

A liquid crystal display device includes a first substrate and a second substrate. The first substrate includes a sheet-like first electrode formed of a transparent conductive film, a first insulator formed to cover the sheet-like first electrode, a plurality of linear second electrodes formed by a transparent conductive film on the first insulator so as to overlap the sheet-like first electrode, and a second insulator formed on the first insulator so as to cover the plurality of linear second electrodes. The first substrate and the second substrate interpose liquid crystal therebetween and are arranged to be opposed to each other. The sheet-like first electrode, the first insulator, and the plurality of linear second electrodes are provided in a pixel region on a surface of the first substrate of a side of the liquid crystal. The second insulator is made of the same material as the first insulator.

14 Claims, 8 Drawing Sheets

LIQUID CRYSTAL DISPLAY DEVICE

CROSS-REFERENCE TO RELATED APPLICATION

The present application claims priority from Japanese Applications JP 2009-094004 filed on Apr. 8, 2009, the content to which is hereby incorporated by reference into this application.

BACKGROUND OF THE INVENTION

1. Field of the Invention

The present invention relates to a liquid crystal display device, in particular, to an in plane switching liquid crystal display device having a structure called fringe field switching (FFS).

2. Description of the Related Art

A cross section of a pixel structure of an in plane switching liquid crystal display device having a structure called fringe field switching (FFS) is illustrated in FIG. 4. FIG. 4 is depicted for comparison with FIG. 1 which illustrates an embodiment of the present invention. Therefore, for a detailed structure of FIG. 4 other than the parts described below, see the description given for FIG. 1.

As illustrated in FIG. 4, a thin film transistor TFT, pixel electrodes PD, and a common electrode CD are provided on a surface of a substrate GLS1 on a liquid crystal LC side. The thin film transistor TFT is turned ON by supplying a scanning signal to a gate bus line GL. Through the turned-ON thin film transistor TFT, a video signal is supplied from a data bus line DR to the pixel electrodes PD. The common electrode CD generates an electric field with the pixel electrodes PD. A reference signal serving as a reference for the video signal is supplied to the common electrode CD. The thin film transistor TFT is covered with a passivation PAS formed of a laminate obtained by sequentially laminating an inorganic passivation film PS and an organic passivation film OP so as to avoid direct contact with the liquid crystal LC. On a surface of the organic passivation film OP, for example, the sheet-like common electrode CD made of indium tin oxide (ITO) is formed. The common electrode CD is covered with a capacitor insulator CI. On an upper surface of the capacitor insulator CI, a plurality of the linear pixel electrodes PD arranged in parallel, which are made of, for example, ITO, are formed so as to superimpose the common electrode CD. The pixel electrodes PD are connected to a source ST of the thin film transistor TFT through a through hole TH formed through the organic passivation film OP and the inorganic passivation film PS. In this case, a hole, which is approximately coaxial with the through hole TH and has larger size than that of the through hole TH, is previously formed through the common electrode CD. In this manner, an electrical short-circuit with the pixel electrodes PD is avoided. On a surface of the common electrode CD, on which the pixel electrodes PD are formed, an alignment layer AF1 is formed so as to cover the pixel electrodes PD. The alignment layer AF1 is held in contact with the liquid crystal LC to serve as a layer for determining an initial orientation direction of molecules of the liquid crystal LC.

The liquid crystal display device configured accordingly is driven in the following manner. A voltage is generated between the pixel electrodes PD and the common electrode CD according to the video signal supplied to the pixel electrodes PD. By an electric field generated by the generated voltage, the molecules of the liquid crystal LC are rotated in a plane parallel to the substrate GLS1. This is the reason why the above-mentioned liquid crystal display device is called the in plane switching liquid crystal display device and the above-mentioned structure of the pixel electrodes PD and the common electrode CD is called the fringe field switching (FFS) structure.

FIG. 4 illustrates an electric flux line EF generated by the electric field between the pixel electrodes PD and the common electrode CD.

As a known document relevant to the present invention, for example, JP 2007-183299 discloses a liquid crystal display device. JP 2007-183299A discloses that portions of the capacitor insulator CI between the adjacent pixel electrodes PD are removed until the common electrode CD lying therebelow in the structure illustrated in FIG. 4 is exposed.

SUMMARY OF THE INVENTION

However, in the liquid crystal display device illustrated in FIG. 4, it is found that charges are likely to accumulate in the capacitor insulator CI so as to disadvantageously cause so-called image sticking.

FIG. 5 is a view illustrating material layers from the pixel electrodes PD to the common electrode CD along the electric flux line EF. The alignment layer AF1, the liquid crystal LC, the alignment layer AF1, and the capacitor insulator CI are present in the stated order between the pixel electrodes PD and the common electrode CD. With this structure, the alignment layer AF1 alone is present between the pixel electrodes PD and the liquid crystal LC, whereas not only the alignment layer AF1 but also the capacitor insulator CI are present between the common electrode CD and the liquid crystal LC. Therefore, although charges EC are injected from the pixel electrode PD into the liquid crystal LC, the charges are scarcely injected from the common electrode CD into the liquid crystal LC. Moreover, the charge injection from the pixel electrodes PD into the liquid crystal LD through the alignment layer AF1 is asymmetric with respect to positive and negative voltages. Therefore, a conductivity provided by the charges injected into the liquid crystal LC also becomes asymmetric for the positive and negative applied voltages. When an AC voltage is applied between the pixel electrodes PD and the common electrode CD to avoid the occurrence of polarization in the liquid crystal LC, a DC current is generated in the applied voltage due to the asymmetry of the conductivity. The DC current is accumulated in the capacitor insulator CI and changes the voltage applied to the liquid crystal LC, thereby causing the image sticking as a change in brightness dependent on a drive voltage.

In the case of the in plane switching liquid crystal display device having the FFS structure, in particular, the pixel electrode PD and the common electrode CD are close to each other with a distance approximately corresponding to a thickness of the capacitor insulator CI therebetween. Therefore, a high electric field is generated in the liquid crystal LC to allow the current to easily flow. As a result, there is a problem that the image sticking becomes noticeable. Further, with a fluctuation in external factors such as heat and light, the charges are injected into the alignment layer AF only on the pixel electrode PD side, with which the alignment layer AF1 is held in direct contact, and generates the voltage. As a result, there is a problem of occurrence of a phenomenon called "flicker", in which a periodic change in light intensity is generated in AC driving.

In this case, the above-mentioned image sticking may be reduced by employing the structure described in JP 2007-183299 A cited above. However, the degree of irregularity due to a level difference between the surface of the common electrode and the surfaces of the pixel electrodes is increased to impair flatness of the surfaces on the liquid crystal LC side. As a result, the irregularity is reflected on the surface of the alignment layer AF1 formed so as to cover the common electrode CD and the pixel electrodes PD, which in turn prevents reliable rubbing to disadvantageously cause poor molecular orientation.

It is an object of one aspect of the present invention to provide a liquid crystal display device which reduces image sticking without impairing flatness of surfaces on a liquid crystal side.

In the liquid crystal display device of one or more embodiments of the present invention, when an insulator corresponding to the capacitor insulator of the prior art is a first insulator, a second insulator is formed on the first insulator so as to cover electrodes (for example, pixel electrodes) formed on the first insulator. The second insulator is made of the same material as the first insulator.

A structure of the present invention is, for example, as follows.

(1) One aspects of the present invention provides a liquid crystal display device including a first substrate and a second substrate. The first substrate includes a sheet-like first electrode formed of a transparent conductive film, a first insulator formed to cover the sheet-like first electrode, a plurality of linear second electrodes formed by a transparent conductive film on the first insulator so as to overlap the sheet-like first electrode, and a second insulator formed on the first insulator so as to cover the plurality of linear second electrodes. The first substrate and the second substrate interpose liquid crystal therebetween and are arranged to be opposed to each other. The sheet-like first electrode, the first insulator, and the plurality of linear second electrodes are provided in a pixel region on a surface of the first substrate of a side of the liquid crystal. The liquid crystal display device is driven by rotating liquid crystal molecules in a plane parallel to the first substrate by a voltage applied between the sheet-like first electrode and the plurality of linear second electrodes. The second insulator is made of the same material as the first insulator.

(2) In the liquid crystal display device of the one aspect of the present invention according to item (1), the first insulator and the second insulator may be made of silicon nitride.

(3) In the liquid crystal display device of the one aspect of the present invention according to item (2), the second insulator may be a thickness of 20 nm or larger and 200 nm or less.

(4) The liquid crystal display device of the one aspect of the present invention according to item (1) may further include an alignment layer formed on an upper surface of the second insulator.

(5) In the liquid crystal display device of the one aspect of the present invention according to item (1), the pixel region may be a region surrounded by a pair of neighboring gate bus lines and a pair of neighboring data bus lines. The pixel region may include a thin film transistor configured to be turned ON by a scanning signal from one of the pair of gate bus lines. A video signal from one of the pair of data bus lines may be supplied to one of the sheet-like first electrode and the plurality of linear second electrodes through the turned-ON thin film transistor. A reference signal serving as a reference for the video signal may be supplied to another one of the sheet-like first electrode and the plurality of linear second electrodes.

(6) The liquid crystal display device of the one aspect of the present invention according to item (5) may further include a passivation formed to cover the thin film transistor. The first electrode may be formed on an upper surface of the passivation.

(7) In the liquid crystal display device of the one aspect of the present invention according to item (6), the passivation may be formed by a laminate obtained by sequentially laminating an inorganic passivation film and an organic passivation film.

(8) In the liquid crystal display device of the one aspect of the present invention according to item (6), the passivation may be formed of an inorganic passivation film, and the inorganic passivation film also may serve as the first insulator.

The above-mentioned structure is merely an example, and the present invention may be appropriately changed without departing from its technical idea. Moreover, examples of the structure of the present invention other than those described above become apparent from the full description of the specification of this application or the accompanying drawings.

The other effects of the present invention become apparent from the full description of the specification.

DETAILED DESCRIPTION OF THE INVENTION

Exemplary embodiments of the present invention are described referring to the accompanying drawings. The same or similar components are denoted by the same reference symbols in each of the drawings and each of the embodiments, and the overlapping description thereof is herein omitted.

First Embodiment

Figure 1:
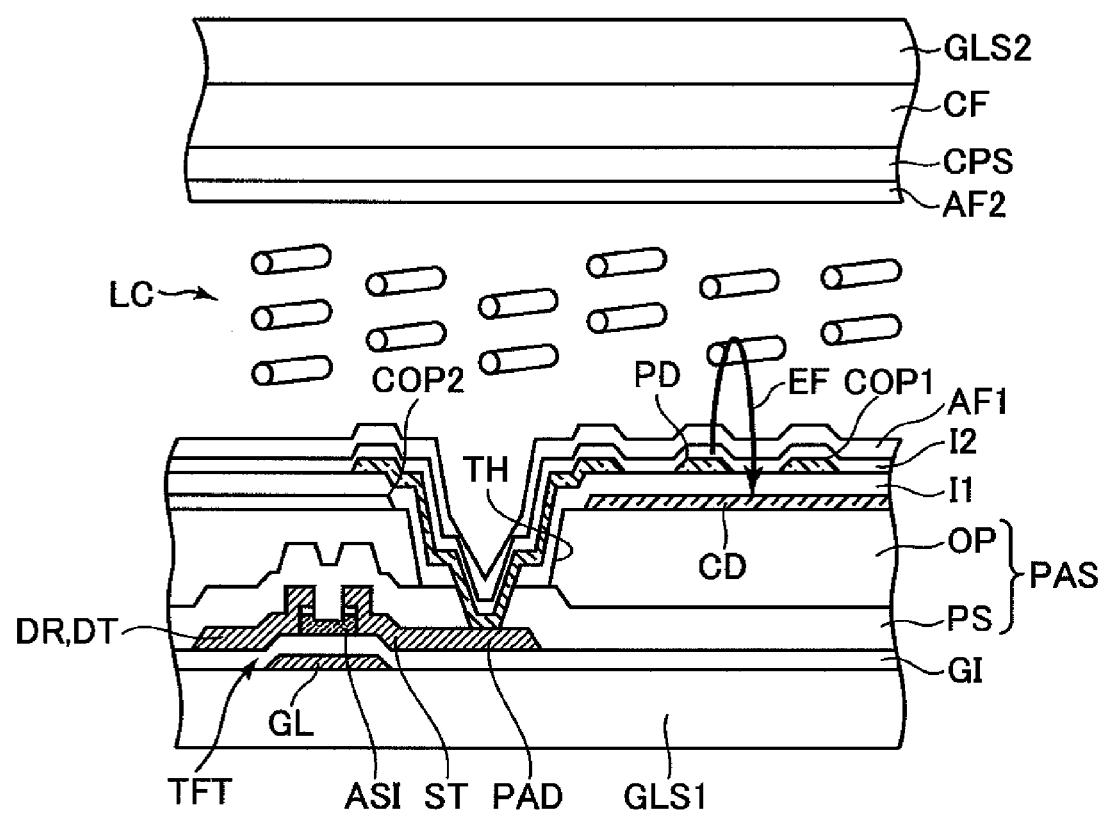
FIG. 1 is a sectional view illustrating a first embodiment of a pixel of a liquid crystal display device according to the present invention, taken along a line I-I illustrated in FIG. 2.
Figure 2:
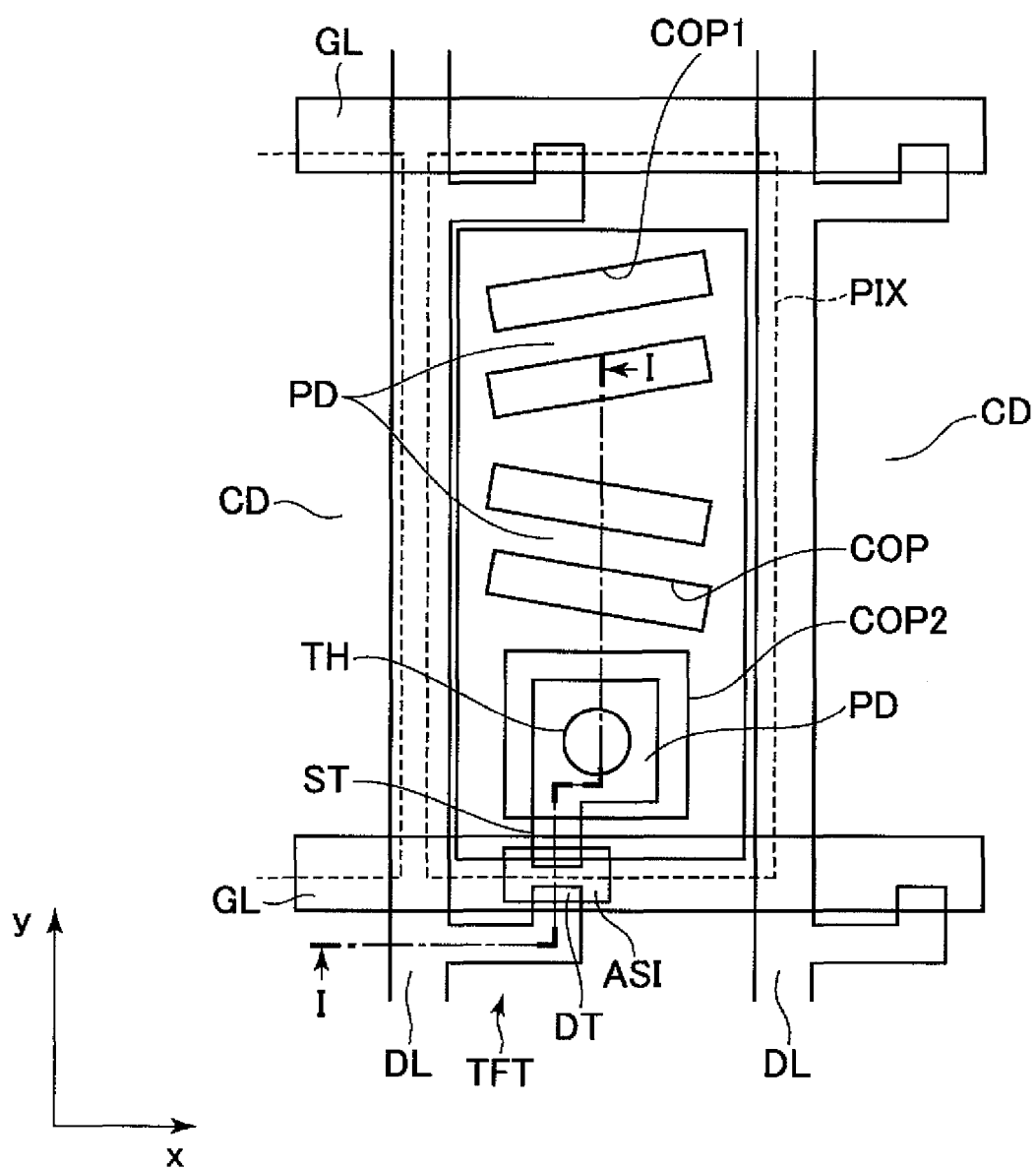
FIG. 2 is a plan view illustrating the first embodiment of the pixel of the liquid crystal display device according to the present invention.

FIG. 2 is a view illustrating a structure of a pixel, which illustrates a first embodiment of a liquid crystal display device of the present invention. FIG. 2 is a plan view as viewed from a liquid crystal side of one substrate GLS1 of a pair of substrates GLS1 and GLS2 which are provided so as to be opposed to each other with a liquid crystal LC interposed therebetween. FIG. 1 is a sectional view taken along a line I-I illustrated in FIG. 2. FIG. 1 also illustrates another substrate GLS2 which is provided so as to be opposed to the substrate GLS1 with the liquid crystal LC interposed therebetween.

First, as illustrated in FIG. 2, a pair of neighboring gate bus lines GL, each extending in an x-direction of FIG. 2, are arranged in parallel in a y-direction. A pair of neighboring data bus lines DL, each extending in the y-direction, are arranged in parallel in the x-direction. A region surrounded by the pair of gate bus lines GL and the pair of data bus lines DL corresponds to a region constituting a pixel PIX (indicated by a dot line illustrated in FIG. 2). A large number of the pixels PIX are arranged in a shape of matrix. A group of the pixels PIX constitutes a liquid crystal display area.

Figure 4:
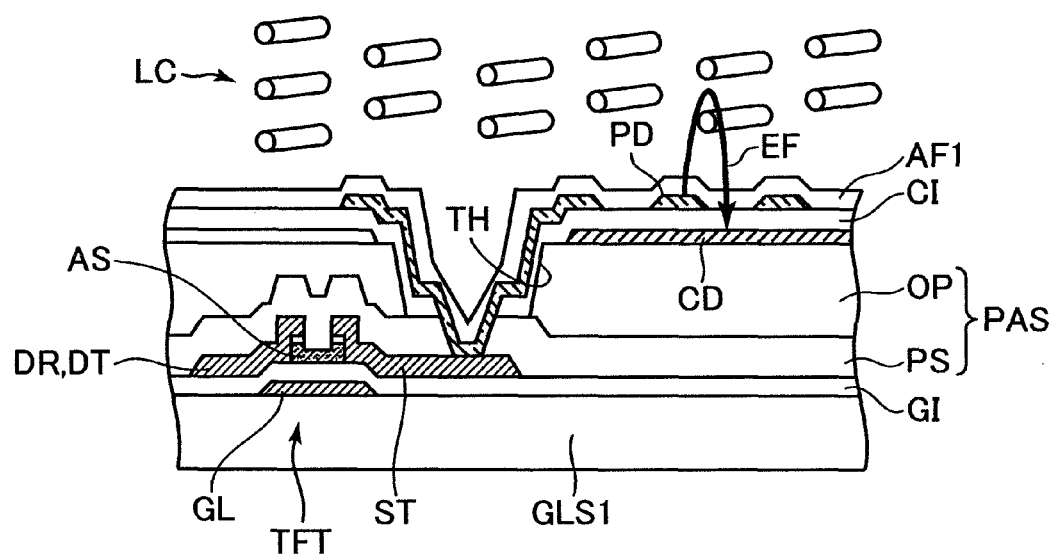
FIG. 4 is a sectional view illustrating an example of a pixel of a conventional liquid crystal display device.
Figure 5:
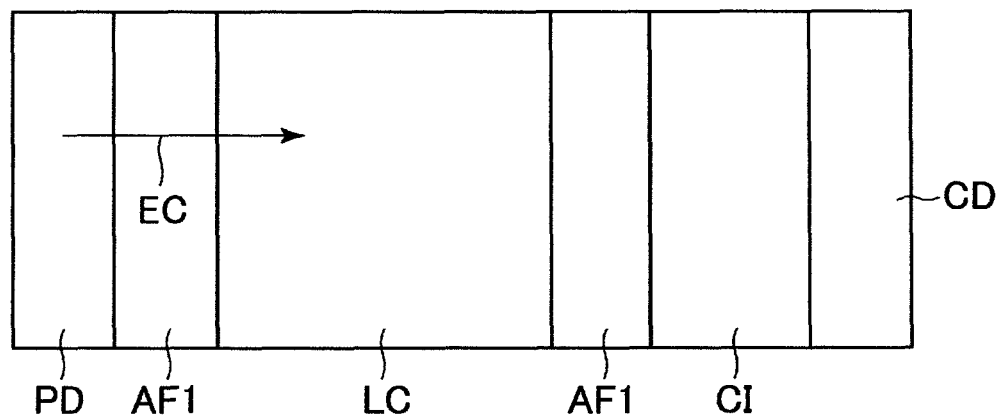
FIG. 5 is a view illustrating material layers from pixel electrodes to a common electrode along an electric flux line in a structure illustrated in FIG. 4.

A thin film transistor TFT, which has a part of the lower gate bus line GL illustrated in FIG. 2 as a gate, is formed. The thin film transistor TFT includes, for example, a layer made of amorphous silicon ASI as a semiconductor layer. A drain DT of the thin film transistor TFT is formed as a portion extended from the data bus line DL. A source ST is extended toward the pixel region so as to include a pad portion PAD. The pad portion PAD is electrically connected to pixel electrodes PD described below. With this structure, a scanning signal is supplied to the gate bus line GL to turn the thin film transistor TFT ON. A video signal from the data bus line DL is supplied to the pixel electrodes PD through the thin film transistor TFT. In an area constituting the liquid crystal display area, a common electrode CD made of, for example, indium tin oxide (ITO) is formed (also formed in a region where the gate bus lines GL and the data bus lines DL are formed). A reference signal serving as a reference for the video signal is supplied from exterior of the liquid crystal display area to the common electrode CD. Moreover, the pixel electrodes PD are formed on a first insulator I1 (see FIG. 1; corresponding to the capacitor insulator CI illustrated in FIG. 4) so as to overlap the common electrode CD. The first insulator I1 is formed so as to cover the common electrode CD. The pixel electrodes PD are formed in the following manner. A plurality of elongated holes COP1 arranged in parallel are formed through a sheet-like electrode made of, for example, ITO. A plurality of linear electrodes, which are arranged in parallel in areas between the holes COP1, form the pixel electrodes PD.

Further, as illustrated in FIG. 1, a gate insulator GI, which is formed on the substrate GLS1 so as to cover the gate bus line GL, is made to have a function of insulating the gate in the thin film transistor TFT. Island-like amorphous silicon ASI is formed on a portion of the gate insulator GI, which superimposes the gate bus line GL. On an upper surface of the amorphous silicon ASI, the drain DT and the source ST are formed so as to be opposed to each other. As a result, a metal insulator semiconductor (MIS) transistor which is a so-called bottom-gate transistor is formed. The drain DT is formed by partially extending the data bus line DL, whereas the source ST has the pad portion PAD extended toward the pixel region.

The thin film transistor TFT is covered with a passivation PAS formed of a laminate obtained by sequentially laminating an inorganic passivation film PS and an organic passivation film OP so as to avoid direct contact with the liquid crystal LC. On a surface of the organic passivation film OP, the common electrode CD made of, for example, ITO is formed. The common electrode CD is covered with the first insulator I1. The first insulator I1 is made of, for example, silicon nitride, and functions as an interlayer insulator between the common electrode CD and the pixel electrodes PD described below. Moreover, the first insulator I1 also functions as a dielectric film for forming a capacitor between the common electrode CD and the pixel electrodes PD. For the reason described above, an insulator corresponding to the first insulator I1 is referred to as the capacitor insulator CI in FIG. 4. On the upper surface of the first insulator film I1, the plurality of linear pixel electrodes PD arranged in parallel, which are made of, for example, ITO, are formed so as to superimpose the common electrode CD. The pixel electrodes PD are connected to the source ST (pad portion PAD) of the thin film transistor TFT through a through hole TH formed through the organic passivation film OP and the inorganic passivation film PS. In this case, a hole COP2, which is approximately coaxial with the through hole TH and has larger size than that of the through hole TH, is previously formed through the common electrode CD. As a result, an electrical short-circuit with the pixel electrodes PD is avoided.

A second insulator I2 is formed on the upper surface of the first insulator I1, on which the pixel electrodes PD are formed, so as to cover the pixel electrodes PD. The second insulator I2 is made of the same material as the first insulator I1, for example, silicon nitride, and is formed by chemical vapor deposition (CVD). Moreover, a thickness of the second insulator I2 is set smaller than that of the first insulator I1. Further, an alignment layer AF1 is formed on the second insulator I2 so as to cover the pixel electrodes PD. The alignment layer AF1 is held in contact with the liquid crystal LC and determines an initial orientation direction of molecules of the liquid crystal LC.

The substrate GLS2 is provided so as to be opposed to the substrate GLS1 with the liquid crystal LC interposed therebetween. A color filter CF, a leveling film CPS, and an alignment layer AF2 are sequentially formed on a surface of the substrate GLS2 of the liquid crystal LC side.

Figure 3:
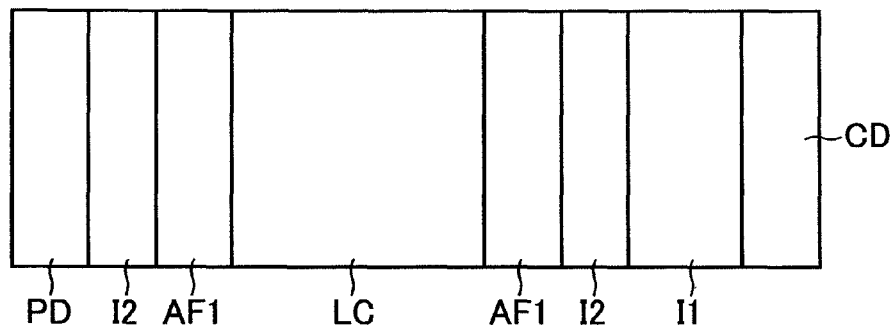
FIG. 3 is a view illustrating material layers from pixel electrodes to a common electrode along an electric flux line in a structure illustrated in FIG. 1.

FIG. 3 is a view illustrating material layers from the pixel electrodes PD to the common electrode CD along an electric flux line EF in the above-mentioned structure of the liquid crystal display device. As illustrated in FIG. 3, the second insulator I2 and the alignment layer AF1 are present between the pixel electrodes PD and the liquid crystal LC, whereas a laminate film of the first insulator I1 and the second insulator I2, which are made of the same material, and the alignment layer AF1 are present between the common electrode CD and the liquid crystal LC. Therefore, a film structure between the liquid crystal LC and the pixel electrodes PD and a film structure between the liquid crystal LC and the common electrode CD are substantially symmetric (except for a difference in film thickness). Therefore, charge injection may be substantially symmetrically performed from the pixel electrodes PD and from the common electrode CD into the liquid crystal LC. Thus, the generation of a DC current is suppressed even at the time of AC driving, thereby preventing image sticking.

Moreover, a voltage generated between the pixel electrodes PD and the liquid crystal LC and a voltage generated between the common electrode CD and the liquid crystal LC, which are generated due to a change in temperature or a change in backlight at the time of lighting, become almost the same. The generated voltages are respectively reversed on the pixel electrode PD side and on the common electrode CD side so as to be then cancelled. As a result, the voltage to be applied to the liquid crystal LC is stabilized so as to suppress the occurrence of so-called flicker.

Further, even when a method such as the CVD which does not have a surface-leveling function is used for forming the second insulator I2 made of silicon nitride, an increase of irregularity may be suppressed by forming the second insulator I2 on the pixel electrode PD and on an area of the first insulator I1 on which the pixel electrodes PD are not formed. As a result, a flat state of the surface with the underlying organic passivation film OP are can be maintained. Therefore, poor molecular orientation at the time of rubbing of the alignment layer AF1 may be suppressed, and hence it is prevented that contrast of the liquid crystal display device is lowered.

Moreover, by providing the second insulator I2 so as to cover the pixel electrodes PD, a distance between the pixel electrodes PD and the common electrode CD along the electric flux line EF except for the liquid crystal LD is increased. As a result, an electric field applied to the liquid crystal LC is reduced to increase a voltage required for driving the liquid crystal. Therefore, in order to suppress the increase in voltage described above, it is desirable that a thickness of the second insulator I2 be set smaller than that of the first insulator I1. When the insulators made of silicon nitride are used, the thickness of the first insulator I1 is generally set to about 100 mm to 400 mm. Therefore, it is preferable that the thickness of the second insulator I2 is 400 mm or less, more preferably, 200 mm or less.

If the thickness of the second insulator I2 is too small, the charge injection through the insulators occurs. As a result, the problem of the asymmetry of a conductivity between the pixel electrodes PD and the common electrode CD is not solved, and hence the image sticking is not sufficiently suppressed. In order to solve such a problem, when silicon nitride films are used as the insulators, the thickness of the second insulator I2 is set to 20 nm or larger, desirably, 50 nm or larger. As a result, the charge injection can be suppressed to prevent the image sticking.

As is made apparent from the above description, according to the liquid crystal display device described in the first embodiment, the image sticking can be reduced without impairing the flatness of the surfaces on the liquid crystal side.

Second Embodiment

Figure 6:
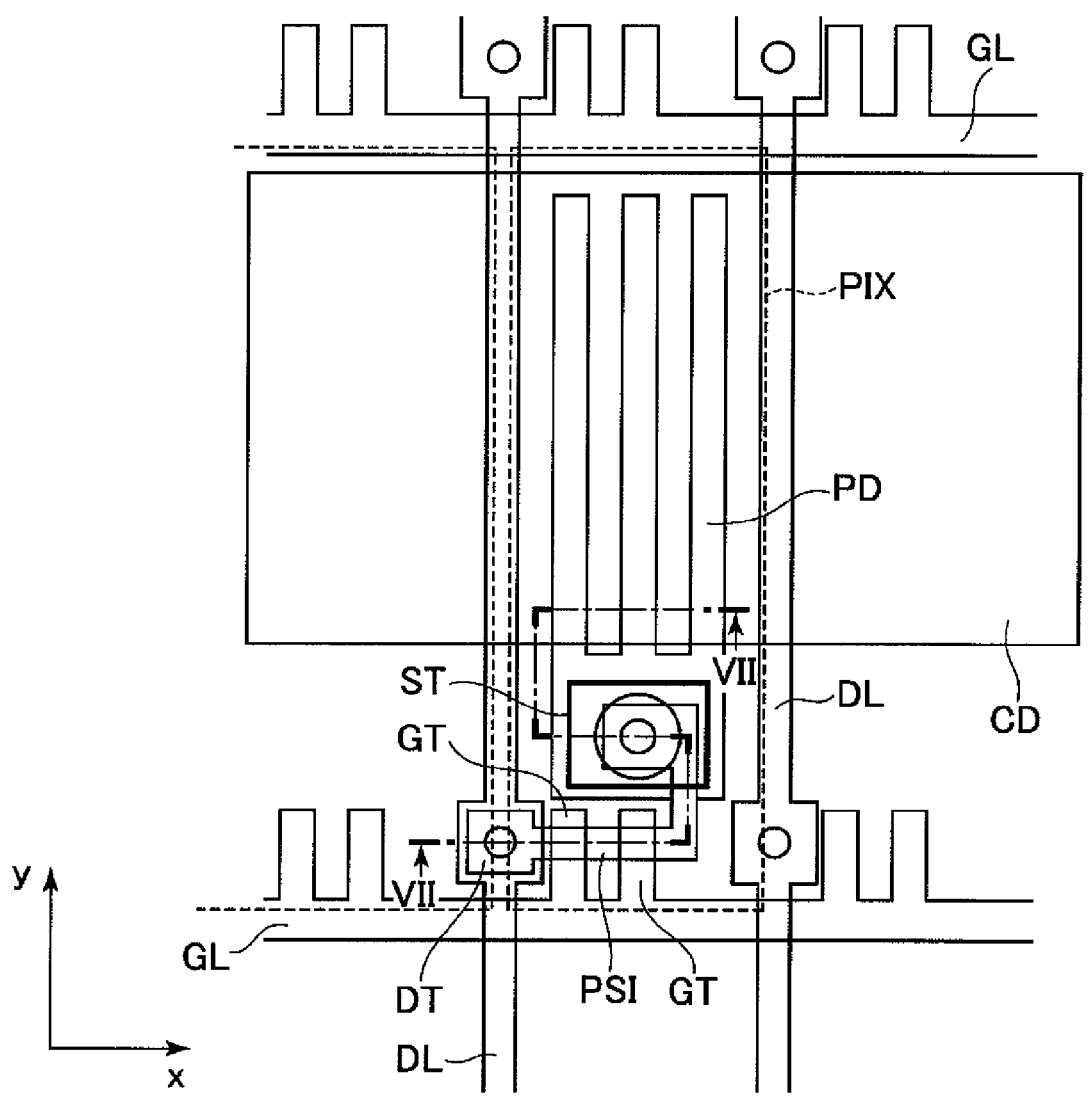
FIG. 6 is a plan view illustrating a second embodiment of a pixel of a liquid crystal display device of the present invention.
Figure 7:
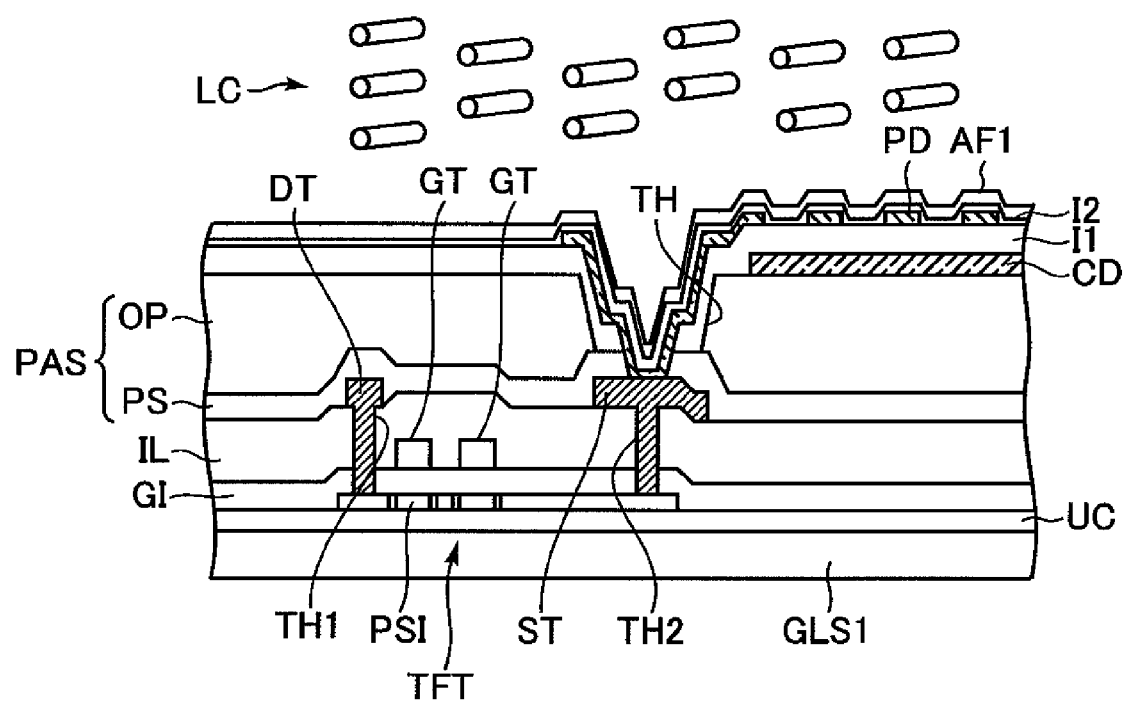
FIG. 7 is a sectional view taken along a line VII-VII illustrated in FIG. 6.

FIG. 6 is a view illustrating a structure of the pixel, illustrating a second embodiment of the liquid crystal display device of the present invention. FIG. 7 is a sectional view taken along a line VII-VII illustrated in FIG. 6.

FIG. 6 is depicted for the comparison with FIG. 2. Differences between the structure illustrated in FIG. 6 and that in FIG. 2 are as follows. First, the thin film transistor TFT includes a semiconductor layer made of polycrystalline silicon PSI. Further, the thin film transistor TFT is a so-called double-gate thin film transistor having two gates. Moreover, the pixel electrodes PD have a comb-like pattern obtained by arranging a plurality of (for example, three in FIG. 6) of linear electrodes, each extending in the y-direction of FIG. 6, in parallel in the x-direction. Further, the common electrode CD is connected to the common electrode CD of the neighboring pixel in the x-direction of FIG. 6 over the data bus line DL. In this manner, the reference signal is supplied to the common electrode CD from the exterior of the liquid crystal display area.

As illustrated in FIG. 7, the thin film transistor TFT includes the island-like polycrystalline silicon PSI formed on the surface of the substrate GLS1 on the liquid crystal LC side through an intermediation of an undercoat UC as a semiconductor layer. The undercoat UC functions as a barrier layer for inhibiting impurities from entering the polycrystalline silicon PSI from the substrate GLS1. The gate insulator GI is formed so as to cover the polycrystalline silicon PSI. The gate insulator GI has a function of insulating the gates in a region where the thin film transistor TFT is formed. The gate bus line GL is formed on the upper surface of the gate insulator GI. On the upper surface of the gate insulator GI, the gate bus line GL is formed. The two gates GT are formed across the polycrystalline silicon PSI so as to be extended from a part of the gate bus line GL. Then, an interlayer insulator IL is formed so as to cover the gate bus line GL and the gates GT. On an upper surface of the interlayer insulator IL, the data bus line DL, the drain DT corresponding to a part of the data bus line DL, and the source ST are formed. The drain DT is electrically connected to a drain region of the polycrystalline silicon PSI through a through hole TH1 that is previously formed through the interlayer insulator IL and the gate insulator GI, whereas the source ST is electrically connected to a source region of the polycrystalline silicon PSI through a through hole TH2 that is previously formed through the interlayer insulator IL and the gate insulator GI. In a fabrication process of the thin film transistor TFT, the polycrystalline silicon PSI is selectively doped with the impurities. As a result, the above-mentioned drain region and source region, and a channel region are formed in the polycrystalline silicon PSI.

A structure of the layers situated above the interlayer insulator IL and the data bus line DL is substantially the same as that of the first embodiment. Specifically, the passivation PAS formed of the laminate obtained by sequentially laminating the inorganic passivation film PS and the organic passivation film OP is formed so as to cover the interlayer insulator IL and the data bus line DL. The organic passivation film OP is formed by application and has a leveled surface. On the surface of the organic passivation film OP, the sheet-like common electrode CD made of, for example, ITO, is formed. The common electrode CD is covered with the first insulator I1 made of, for example, silicon nitride. On the upper surface of the first insulator I1, the plurality of linear pixel electrodes PD arranged in parallel, which are made of, for example, ITO, are formed so as to superimpose the common electrode CD. The pixel electrodes PD are connected to the source ST of the thin film transistor TFT through the through hole TH formed through the organic passivation film OP and the inorganic passivation film PS. In this case, the electrical short-circuit of the pixel electrodes PD is avoided by forming the through hole TH in a region which does not correspond to the region where the common electrode CD is formed. On the surface of the first insulator I1 on which the pixel electrodes PD are formed, the second insulator I2 is formed so as to cover the pixel electrodes PD. The second insulator I2 is made of the same material as the first insulator I1. On the surface of the second insulator I2, the alignment layer AF1 is formed.

In the second embodiment described above, by using the polycrystalline-silicon thin film transistor having an excellent driving force, a part of a drive circuit can be provided in a peripheral area of the substrate. As a result, the number of connection terminals can be reduced, and hence the structure suitable for a high-definition liquid crystal display device can be realized.

Moreover, as in the case of the first embodiment, the layer structure between the pixel electrodes PD and the liquid crystal LD and the layer structure between the common electrode CD and the liquid crystal LD can be made substantially symmetric. As a result, the image sticking can be suppressed. Further, because the irregularity of the surface of the pixel substrate is not increased, the present invention can be applied to the high-definition liquid crystal display device.

Even when the liquid crystal display device is configured as described above, as in the case of the first embodiment, the image sticking may be reduced without impairing the flatness of the surfaces on the liquid crystal side.

Third Embodiment

Figure 8:
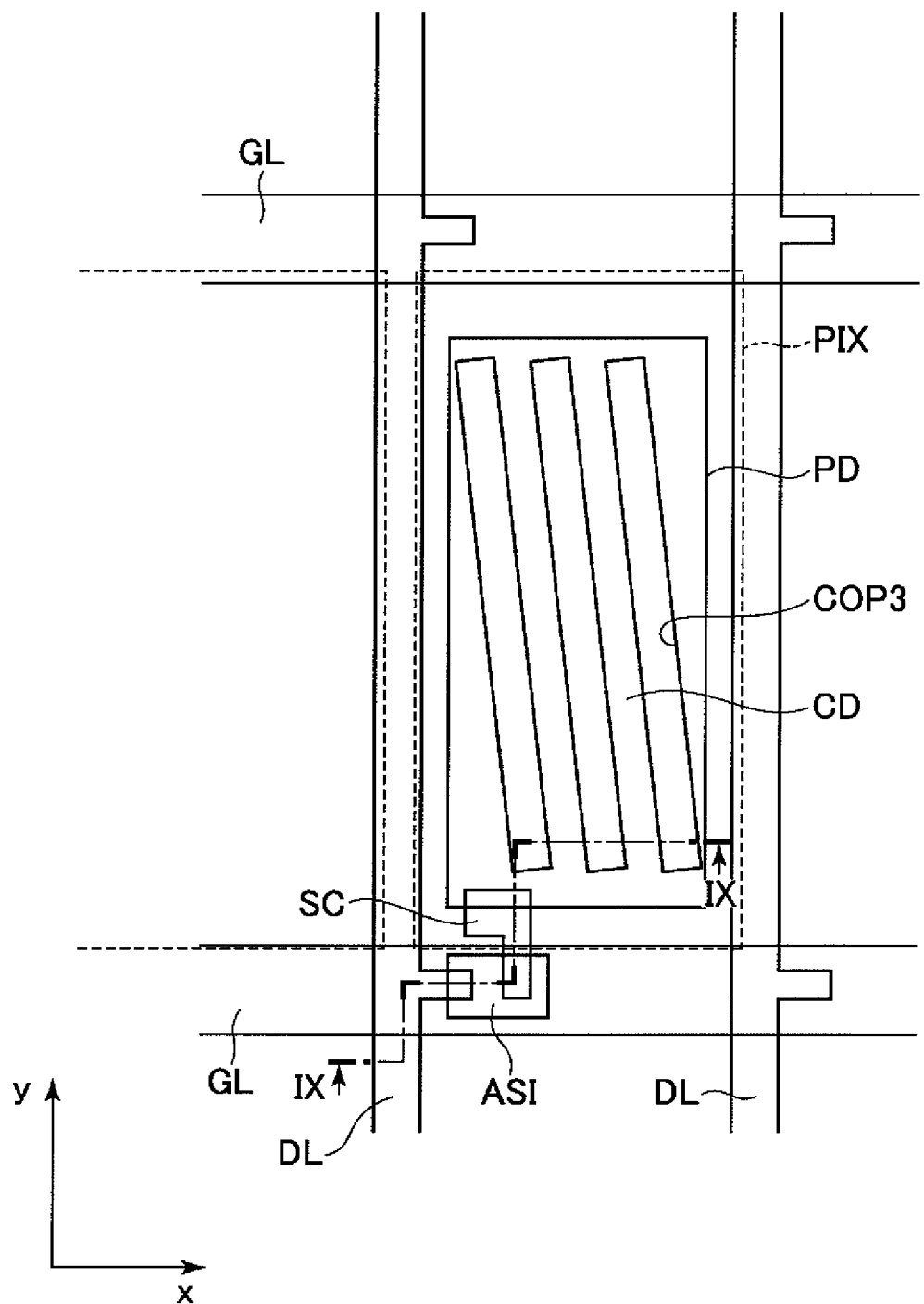
FIG. 8 is a plan view illustrating a third embodiment of a pixel of a liquid crystal display device of the present invention.
Figure 9:
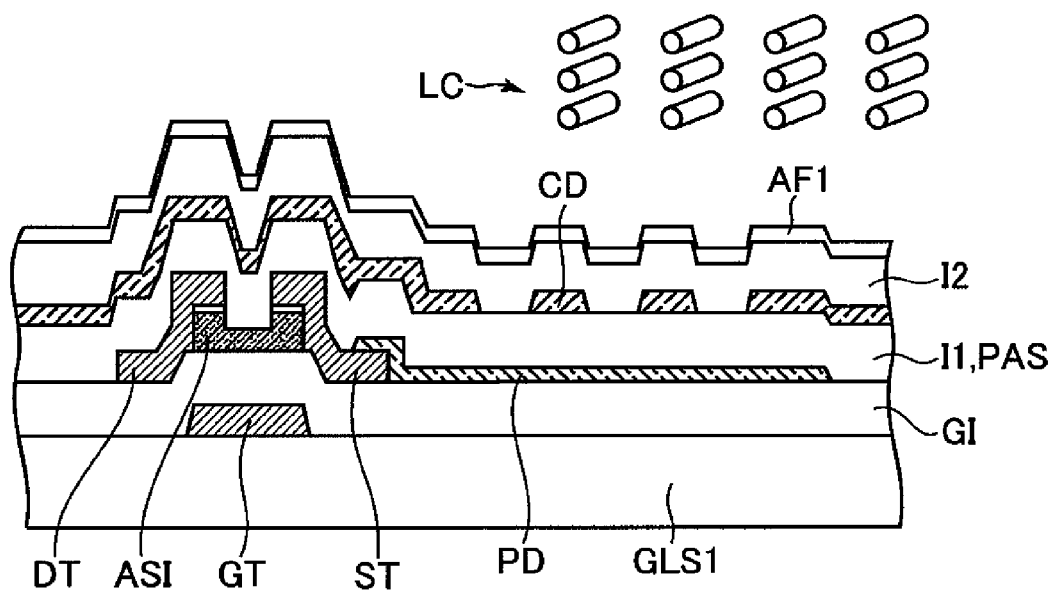
FIG. 9 is a sectional view taken along a line IX-IX illustrated in FIG. 8.

FIG. 8 is a view illustrating a structure of the pixel, illustrating a third embodiment of the liquid crystal display device of the present invention. FIG. 9 is a sectional view taken along a line IX-IX illustrated in FIG. 8.

FIG. 8 is depicted for the comparison with FIG. 2. Differences between the structure illustrated in FIG. 8 and the structure illustrated in FIG. 2 are as follows. First, regarding the common electrodes CD and the pixel electrode PD formed as different layers through the insulator, the pixel electrode PD is located below, whereas the common electrodes CD are located above. In this case, the pixel electrode PD is formed of a sheet-like electrode made of, for example, ITO, which is provided in the region where the pixel PIX is formed. On the other hand, the common electrodes CD are formed by forming holes COP3 through, for example, an ITO film which is formed over the entire liquid crystal display area (the ITO film is formed even in a region where the gate bus line GL and the data bus line DL are formed). The holes COP3 are a plurality of elongated holes arranged in parallel in the pixel region. A plurality of linear electrodes arranged in parallel, each being formed between the holes COP3, constitute the common electrodes CD.

As illustrated in FIG. 9, the pixel electrode PD is formed on the gate insulator GI having a function of insulating the gate of the thin film transistor TFT. Moreover, the pixel electrode PD is formed so as to partially superimpose the source ST of the thin film transistor TFT to be electrically connected to the source ST. Then, the first insulator I1 is formed so as to cover the thin film transistor TFT and the pixel electrode PD. The first insulator I1 is made of, for example, silicon nitride. The first insulator I1 is provided for insulation between the pixel electrode PD and the common electrodes CD described below and has a function of the capacitor insulator for forming a capacitor between the pixel electrode PD and the common electrodes CD. The first insulator I1 also has a function of the passivation PAS for avoiding direct contact of the thin film transistor TFT with the liquid crystal LC. On the upper surface of the first insulator I1, the common electrodes CD are formed. Then, the second insulator I2 is formed so as to cover the common electrodes CD. The second insulator I2 is made of the same material as the first insulator I1. On the upper surface of the second insulator I2, the alignment layer AF1 is formed.

In the third embodiment described above, the first insulator I1 also functions as the passivation PAS for avoiding the direct contact of the thin film transistor TFT with the liquid crystal LC. As a result, a fabrication step of independently forming the passivation PAS can be omitted, and hence the number of fabrication steps can be reduced. Moreover, by forming the second insulator I2 of the same material as the first insulator I1, the layer structure between the liquid crystal LC and the pixel electrode PD and the layer structure between the liquid crystal LC and the common electrodes CD along the electric field become substantially symmetric. As a result, the image sticking and the flicker can be suppressed.

Although the present invention has been described with the embodiments, the structures described in the above-mentioned embodiments are merely examples. The present invention may be changed or modified without departing from its technical idea. The structures described in the embodiments may be used in combination as long as they do not conflict with each other.

What is claimed is:

1. A liquid crystal display device comprising:
 a first substrate comprising:
  a transparent sheet-like first electrode formed of a transparent conductive film;
  a first insulator formed to overlie an upper surface of the sheet-like first electrode;
  a plurality of transparent linear second electrodes formed by a transparent conductive film on the first insulator so as to overlie at least the first insulator and the sheet-like first electrode;
  a second insulator formed on the first insulator so as to overlie at least the plurality of linear second electrodes, the first insulator and the sheet-like first electrode and
  an alignment layer formed so as to overlie at least the second insulator, the plurality of linear second electrodes, the first insulator and the sheet-like first electrode; and
 a second substrate;
 wherein the first substrate and the second substrate interpose liquid crystal therebetween and are arranged to be opposed to each other;
 wherein the sheet-like first electrode, the first insulator, and the plurality of linear second electrodes are provided in a pixel region on a surface of the first substrate of a side of the liquid crystal;
 wherein the liquid crystal display device is driven by rotating liquid crystal molecules in a plane parallel to the first substrate by a voltage applied between the sheet-like first electrode and the plurality of linear second electrodes,
 wherein the second insulator is made of the same material as the first insulator;
 wherein the second insulator has a thickness of at least 20 nm and no greater than 200 nm; and
 wherein the second insulator is formed between the alignment layer and the plurality of linear second electrodes including in an area in which an opening is formed and extends to a layer lower than a layer of the sheet-like first electrode.

2. The liquid crystal display device according to claim 1, wherein the first insulator and the second insulator are made of silicon nitride.

3. The liquid crystal display device according to claim 1, wherein the pixel region is a region surrounded by a pair of neighboring gate bus lines and a pair of neighboring data bus lines,
 wherein the pixel region includes a thin film transistor configured to be turned ON by a scanning signal from one of the pair of gate bus lines,
 wherein a video signal from one of the pair of data bus lines is supplied to one of the sheet-like first electrode and the plurality of linear second electrodes through the turned-ON thin film transistor, and
 wherein a reference signal serving as a reference for the video signal is supplied to another one of the sheet-like first electrode and the plurality of linear second electrodes.

4. The liquid crystal display device according to claim 3 further comprising a passivation formed to cover the thin film transistor,
 wherein the first electrode is formed on an upper surface of the passivation.

5. The liquid crystal display device according to claim 4, wherein the passivation is formed by a laminate obtained by sequentially laminating an inorganic passivation film and an organic passivation film.

6. The liquid crystal display device according to claim 4, wherein the passivation is formed of an inorganic passivation film, and
 wherein the inorganic passivation film also serves as the first insulator.

7. The liquid crystal display device according to claim 1, wherein the second insulator has the thickness set so as to enable suppression of charge injection and to prevent image sticking.

8. The liquid crystal display device according to claim 1, wherein the first insulator has a thickness larger than the thickness of the second insulator.

9. The liquid crystal display device according to claim 1, wherein the opening is formed at least in the sheet-like first electrode.

10. The liquid crystal display device according to claim 1, wherein the liquid crystal display device is configured to substantially prevent generation of flicker during display.

11. A liquid crystal display device comprising:
a first substrate comprising:
a transparent sheet-like first electrode formed of a transparent conductive film;
a first insulator formed to overlie an upper surface of the sheet-like first electrode;
a plurality of transparent linear second electrodes formed by a transparent conductive film on the first insulator so as to at least overlie the first insulator and the sheet-like first electrode;
a second insulator formed on the first insulator so as to overlie the plurality of linear second electrodes, the first insulator and the sheet-like first electrode;
an alignment film formed on the second insulator; and
a second substrate;
wherein the first substrate and the second substrate interpose liquid crystal therebetween and arranged to be opposed to each other, the liquid crystal being in contact with the alignment film formed on the second insulator,
wherein the sheet-like first electrode, the first insulator, and the plurality of linear second electrodes are provided in a pixel region on a surface of the first substrate of a side of the liquid crystal,
wherein the liquid crystal display device is driven by rotating liquid crystal molecules in a plane parallel to the first substrate by a voltage applied between the sheet-like first electrode and the plurality of linear second electrodes,
wherein the second insulator is made of the same material as the first insulator,
wherein the second insulator has a thickness which is less than a thickness of the first insulator,
wherein the thickness of the second insulator enables suppression of charge injection and prevention of image sticking, and
wherein the second insulator is formed between the alignment layer and the plurality of linear second electrodes including in an area in which an opening is formed and extends in a layer lower than a layer of the sheet-like first electrode.

12. The liquid crystal display device according to claim 11, wherein the thickness of the second insulator is at least 20 nm and no greater than 200 nm so as not to increase the voltage required for driving the liquid crystal.

13. The liquid crystal display device according to claim 11, wherein the opening is formed at least in the sheet-like first electrode.

14. The liquid crystal display device according to claim 11, wherein the liquid crystal display device is configured to substantially prevent generation of flicker during display.

* * * * *